United States Patent [19]

Leipold

[11] 4,370,354
[45] Jan. 25, 1983

[54] STABILIZED FRUIT SUSPENSIONS AND METHOD FOR PREPARING THE SAME

[75] Inventor: Dianne P. Leipold, Newark, Del.

[73] Assignee: Hercules Incorporated, Wilmington, Del.

[21] Appl. No.: 327,150

[22] Filed: Dec. 3, 1981

[51] Int. Cl.³ .................... A23L 1/06; A23C 9/123; A23C 9/13

[52] U.S. Cl. .................... 426/573; 426/577; 426/583

[58] Field of Search ............ 426/577, 583, 573, 654

[56] References Cited

U.S. PATENT DOCUMENTS

| | | | |
|---|---|---|---|
| 2,910,365 | 10/1959 | Histon | 426/577 |
| 3,128,190 | 4/1964 | Donay et al. | 426/583 |
| 3,556,810 | 1/1971 | Moirano | 426/577 |
| 3,692,541 | 9/1972 | Altieri et al. | 426/577 |
| 3,726,690 | 4/1973 | Schuppner | 426/577 |
| 3,930,057 | 12/1975 | Jokay | 426/577 |
| 4,200,661 | 4/1980 | Brigand et al. | 426/583 |
| 4,225,623 | 9/1980 | Stussi | 426/583 |
| 4,268,533 | 5/1981 | Williams et al. | 426/577 |

*Primary Examiner*—Jeanette M. Hunter
*Attorney, Agent, or Firm*—Jeffrey F. Craft

[57] ABSTRACT

A fruit suspension which contains a mixture of from 70% to 30% low methoxyl pectin and from 30% to 70% xanthan based on the total weight of gum added, preferably a 50:50 mixture, is effectively stabilized. Such a mixture is particularly useful in stabilizing the fruit suspension employed in sundae style yogurts because it eliminates problems with unwanted gelatin and fruit float.

8 Claims, No Drawings

STABILIZED FRUIT SUSPENSIONS AND METHOD FOR PREPARING THE SAME

This invention relates to the stabilization of fruit suspensions. In particular it relates to a method of improving the shelf life of such fruit suspensions by controlling gelation thereof. In a specific embodiment, it relates to a yogurt fruit suspension stabilized by means of a specific blend of natural gums.

Sundae style yogurt is the name given to certain types of yogurt into which fruit has been added to a cultured milk base. The fruit, in the form of a thickened jam-like suspension, is usually found on the bottom of the container. To cause the fruit to gel and form the jam-like suspension, chopped fruit, such as cherries, peaches, pineapple or strawberries, is cooked in a aqueous low methoxyl pectin-sugar solution for a short time in much the same manner as jam or jelly is prepared. The suspension required for incorporation into yogurt, however, is required to be substantially softer and more readily flowable than are conventional jams so that the suspension may be easily stirred up from the bottom of the container into the cultured milk base. In order to meet these criteria, low methoxyl pectin is employed as the gelling agent.

Use of low methoxyl pectin as the gelling agent is attended by certain difficulties resulting from the fact that it is calcium sensitive and in the presence of calcium tends to form stiffer gels than are desired. One difficulty is that all fruit contains calcium. Consequently, an allowance must be made for calcium-pectin reaction when formulating a fruit suspension of the requisite consistency. Moreover, because different fruits contain different amounts of calcium, the pectin concentration must be varied according to the particular fruit being used.

A second difficulty in employing pectin as the gelling agent comes about when the fruit suspension contacts the cultured milk base. Calcium in the milk tends to react with the pectin and, as does the calcium in the fruit, causes further gelation and changes in the consistency of the suspension making it difficult to stir into the cultured milk base.

These difficulties can be overcome by adding an excess of calcium over the amount which can react with the pectin. Where this is done it is possible to prepare fruit suspensions which employ the same low pectin concentration irrespective of the fruit being added. Furthermore, since the pectin is totally reacted, additional gelation in presence of milk is avoided. This solution to the problem, however, is not popular among yogurt manufacturers as the product containing added calcium cannot be labeled "all natural".

A distinct problem which is encountered in the manufacture of sundae style yogurt is fruit float. At elevated temperatures of about 180° to 185° F., those temperatures which would ideally be employed during processing in order to provide sterilization of the product, the fruit suspension may break down and the pieces of fruit float up to the top of the cultured milk base. to circumvent this problem lower temperatures may be used, or the fruit may be macerated, or an additional viscosifier may be added. All of these alternatives are undesirable. An unexpected advantage of the disclosed invention is that elevated temperatures can be used without encountering any problems with fruit float.

In accordance with this invention, it has been found that the reaction between pectin and calcium is greatly impeded in the presence of xanthan. Specifically, the invention is a method of inhibiting or controlling the gelation of low methoxyl pectin containing fruit suspensions in the presence of calcium by incorporating into said fruit suspensions an amount of xanthan sufficient to inhibit the reaction between pectin and calcium to a preselected degree. The invention also contemplates a fruit suspension comprising about 30 to 70% xanthan and 70 to 30% of pectin based on total weight of gum added.

Both xanthan and pectin are well known, naturally occurring, water soluble polysaccharide gums. The pectin to which the method of the invention is applicable can be any of the low methoxyl pectins which have a degree of methoxylation of less than about 50%. Also useful are the amidated low methoxyl pectins having a degree of methoxylation of about 25 to about 50% and a degree of amidation between about 10 to about 25%. "Degree of methoxylation" and "degree of amidation" are both terms known in the art. They refer to the percentage of the pectin's uronic acid carboxyls which are methoxylated or amidated respectively.

Xanthan is the fermentation product of the microbe of the Xanthomonas genus. Consequently, xanthan may be used in a yogurt which can be labeled "all natural". The product of any of the various xanthomonas species can be employed in the method and composition of the invention. That prepared by the species X. Campestris is the most prevalent and is used in the examples presented hereinafter to illustrate the invention.

The fruit suspension to be stabilized by the method of this invention can contain from about 30 to 60% by weight of soluble solids. Soluble solids include the soluble sugars, pectins and the like found in the fruit plus the added pectin, xanthan, sugars and other gelation promoting additives incorporated during gelation. Any of the conventional fruit suspensions can be benefitted by the method of this invention, i.e., cherry, peach, or various berries.

The amount of pectin required to obtain the requisite degree of gelation depends on several factors including the soluble solids concentration of the suspension and the characteristics of the pectin being used as a gelling agent. The amount of pectin required will be known to the practitioner or easily determinable. The degree of methoxylation of the pectin is dependent on the amount of soluble solids in the yogurt. The greater the amount of soluble solids the greater the degree of methoxylation required. The degree of methoxylation will be about 50% or less. The degree of methoxylation required in a particular application will also be known to one skilled in the art.

The amount of xanthan required depends on whether the pectin-calcium interaction is to be completely stopped or whether it is to be allowed to a predetermined degree. The choice will depend on the preference of the practioner. For most fruit suspensions the inhibition of the pectin-calcium interaction is complete when there is as much xanthan as there is pectin. As the amount of xanthan is decreased controlled amounts of pectin-calcium interaction occur. Acceptable ratios, based on the total weight of gum added, range from about 70:30 to about 30:70 pectin to xanthan and preferably from about 60:40 to about 40:60 pectin to xanthan. In most cases a 50:50 ratio is effective and that ratio is most preferred. The xanthan, dissolved in an aqueous solution, may be added at any time before the fruit suspension begins to gel. It has been found to be most convenient to form an aqueous solution containing both xanthan and pectin so that the two gums may be added together.

The cultured milk base to which the fruit suspension may be added can be the conventional cultured milk bases. The preparation of these bases is well known to those skilled in the yogurt making art. The amount of fruit suspension to be added to the cultured milk base is also a matter of choice of the practioner. In general it will be about 20% fruit suspension to 80% cultured milk base, based on weight. Typically, the fruit suspension and the yogurt are combined at a temperatures from about 30° C. to about 42° C.

The invention is illustrated by the following examples, but is not intended to be limited thereby.

EXAMPLE 1

A series of aqueous solutions of sucrose and low methoxyl pectin (degree of methoxylation (DM) about 33.4) containing 15 mg. of calcium (added as $CaCl_2$) per gram of pectin, was prepared. The total soluble solids level was 40% based on the weight of the entire reaction mixture.

A parallel series of solutions in which similar amounts of pectin and calcium were combined with varying amounts of xanthan was also prepared. In the parallel series the sucrose concentration was decreased an appropriate amount in order that each solution would retain a 40% soluble solids level.

All the solutions were agitated vigorously until complete dissolution and then allowed to sit at 25±2° C. until gelation was complete. The solutions sat from 16–20 hours. Gel strength data are recorded in Table 1. The gel strengths in all of the examples were measured on a Boucher Electronic Jelly Tester manufactured by C. Stevens Ltd of London, U.K. The greater the gel strength the more gelation that has occurred.

TABLE 1

| Sample # | Grams Pectin/ liter | Gel Strength (grams) | Grams Pectin/ Grams Xanthan | Gel Strength (grams) |
|---|---|---|---|---|
| 1a | 12.0 | 207 | — | — |
| 1b | 10.8 | 202 | 10.8/1.2 | 125 |
| 1c | 9.6 | 170 | 9.6/2.4 | 85 |
| 1d | 8.4 | 137 | 8.4/3.6 | 67 |
| 1e | 6.0 | 116 | 6.0/6.0 | 53 |
| 1f | 3.6 | 58 | 3.6/8.4 | * |
| 1g | — | — | 0/12 | 57 |

*too soft to measure

It is clear from the data in Table 1 that the presence of the xanthan has a very definite inhibiting effect on the gelling of the pectin for the gel strength was reduced by about 50% in the xanthan containing solutions.

EXAMPLE 2

To demonstrate the effect of varying calcium ion concentrations a series of 40% soluble solids solutions were prepared. These aqueous solutions contained sucrose, 9.6 gms/liter low methoxyl pectin (D.M. about 33.4) and varying amounts of calcium. A similar series of solutions in which 2.4 gms/liter of the sucrose was replaced with an equivalent amount of xanthan was also prepared. The inhibiting effect of xanthan at various calcium concentrations is clearly shown by the data in Table 2. The gel strength of pectin-xanthan blends is substantially less than the pectin alone at all calcium concentrations.

TABLE 2

| Sample # | Gel Strength Pectin Alone | Gel Strength Pectin/Xanthan $Ca^{+2}$ | Concentration[1] |
|---|---|---|---|
| 2a | * | * | 0 |
| 2b | 82 | 58 | 5 |
| 2c | 150 | 78 | 10 |
| 2d | 170 | 85 | 15 |
| 2e | 205 | 116 | 20 |
| 2f | 194 | 149 | 25 |
| 2g | 185 | pregelled | 30 |

[1]$mgCa^{+2}$/gram of pectin
*too soft to measure

EXAMPLE 3

The gelling characteristics of two series of 40% soluble solids yogurt fruit mixes—one series with added calcium, the other without—were compared and their gel strengths were observed.

A solution 9.6 grams of low methoxyl pectin (D.M. about 33.4), 2.4 grams xanthan, 25 grams sugar and 0.5 gram potassium sorbate, a preservative, was prepared by vigorous mixing in 290 ml of tap water. About 400 grams of chopped Bing cherries (23% soluble solids) were heated to 85° C. and added to the gum solution. The gum solution was reheated to 85° and, with agitation, 268 grams sugar was added. Agitation was continued until all soluble ingredients were dissolved.

A mixture of $CaCl_2.2H_2O$ (22.05 g/liter) and 5.6 ml of 50% (w/v) citric acid was added to 50 mm petri dishes containing the solution so that there would be final concentrations of 5, 10, 15, 20 and 25, mg of $Ca^{+2}$/gram of pectin would be final. A sixth petri dish was tested without any added calcium mixture. The citric acid was added to adjust the pH to that of a cultured milk base.

A series of controls were prepared containing the same amount, 9.6 grams, of low methoxyl pectin but no xanthan.

Gel strengths of all these specimens, along with their controls are recorded in Table 3. It can be seen that the addition of xanthan significantly reduces the gel strength of cherry suspensions.

TABLE 3

| Sample # | $Ca^{+2}$ Con. | Gel Strength Pectin Alone | Gel Strength Pectin/Xanthan |
|---|---|---|---|
| 3a | 0 | 60 | 60 |
| 3b | 5 | 97 | 82 |
| 3c | 10 | 154 | 110 |
| 3d | 15 | 234 | 127 |
| 3e | 20 | pre-gel | 160 |
| 3f | 25 | pre-gel | 152 |

EXAMPLE 4

The procedure of Example 3 was repeated using a peach yogurt fruit suspension. Data are recorded in Table 4. Again, it can be seen that xanthan significantly reduces the gel strand of the suspension.

TABLE 4

| Sample # | $Ca^{+2}$ Con. | Gel Strength Pectin Alone | Gel Strength Pectin/Xanthan |
|---|---|---|---|
| 4a | 0 | 64 | 64 |
| 4b | 5 | 117 | 87 |
| 4c | 10 | 202 | 126 |
| 4d | 15 | 211 | 160 |
| 4e | 20 | 254 | 175 |

TABLE 4-continued

| Sample # | $Ca^{+2}$ Con. | Gel Strength Pectin Alone | Gel Strength Pectin/Xanthan |
|---|---|---|---|
| 4f | 25 | pre-gel | 195 |

EXAMPLE 5

In this example, Bing cherry yogurt was prepared by the following procedure:

A. Preparation of yogurt fruit

|  | 30% SS | 50% SS | 60% SS |
|---|---|---|---|
| Chopped Bing Cherries (26.5% SS) | 800 g. | 800 g. | 800 g. |
| Low Pectin | 15 | 12 | 8 |
| Xanthan | 15 | 12 | 8 |
| Sugar | 50 | 50 | 50 |
| Potassium Sorbate | 1 | 1 | 1 |
| Tap Water | 820 | 420 | 220 |
| Sugar | 302 | 707 | 915 |
| Citric Acid Monohydrate (50% w/v) | 11 ml | 11 ml | 11 ml |

The pectin, xanthan, potassium sorbate and 50 grams of sugar were dry blended, then dissolved in water with vigorous agitation. The cherries were heated to 85° C. and added to this solution, which was then reheated and remaining sugar was added. The solution was evaporated to 2000 g and the citric acid solution was added to produce a pH of about 4.

One ounce of solution was transferred to each of a number of 4½ ounce plastic cups. At the same time, controls were made by filling twenty 50 mm petri dishes with solution. All the solutions were allowed to set overnight at room temperature.

B. Preparation of Yogurt

To a 5-liter round bottom flask equipped with a heating mantle, stirrer and thermometer was charged 3117 grams of low fat (2%) milk. With stirring, a dry blend of 130 grams of nonfat dry milk and 3.25 grams low methoxyl pectin was added and the temperature was raised to 85° C. and maintained at that point for 15 minutes in order to pasteurize it. The suspension was then cooled to 42° C. and 163 grams of yogurt containing live culture was added.

Three ounces of this warm (42° C.) yogurt culture was added to each cup. All cups were incubated at 42° C. until the pH reached approximately 4, which generally required 3½ to 4 hours, whereupon they were removed from the incubator and refrigerated. The control dishes containing only yogurt fruit were also refrigerated.

C. Testing

Samples of the fruit portion of each formulation were tested for gel strength. This was done immediately and at one week intervals over a period of four weeks. The tests provided an evaluation of fruit suspension gelation in the presence of $Ca^{+2}$ from the cultured milk base. Results, shown in Table 5a, clearly show that only a minor gel strength increase attributable to the presence of milk.

TABLE 5a

| Sample # | 0 week | 1 week | 2 weeks | 3 weeks | 4 weeks |
|---|---|---|---|---|---|
| 30% Control (no milk) | 61 | 66 | 69 | 71 | 71 |
| 30% SS |  | 69 | 67 | 64 | 66 |
| 50% Control | 74 | 70 | 74 | 79 | 77 |
| 50% SS |  | 65 | 62 | 57 | 67 |
| 60% Control | 77 | 73 | 77 | 87 | 85 |
| 60% SS |  | 63 | * | 72 | * |

* = too soft to measure.

This procedure was also followed to obtain the gel strengths, over a period of weeks of a pectin only fruit suspension in sundae style yogurt. The results, shown in Table 5b, when compared to the xanthan containing fruit suspensions of 5a, demonstrate xanthan's effectiveness in prevented gelation of the fruit suspension of sundae style yogurt.

TABLE 5b

| Sample # | 0 week | 1 week | 2 weeks | 3 weeks | 4 weeks |
|---|---|---|---|---|---|
| 30% Control (no milk) | 128 | 117 | 109 | 110 | 115 |
| 30% SS |  | 152 | 154 | 153 | 179 |
| 40% Control | 77 | 73 | 73 | 74 | 75 |
| 40% SS |  | 202 | 211 | 220 | 240 |
| 50% Control | 99 | 104 | 99 | 96 | 94 |
| 50% SS |  | 144 | 165 | 163 | 164 |

I claim:

1. In a fruit suspension containing fruit, sugar, low methoxyl pectin and water, the improvement which comprises incorporating xanthan in an amount such that the xanthan to pectin ratio is from about 30:70 to about 70:30 based on the total weight of the xanthan and pectin added.

2. The fruit suspension of claim 1 wherein the xanthan to pectin ratio is from about 40:60 to about 60:40 based on the total weight of the xanthan and pectin added.

3. In a method for making a fruit suspension wherein fruit, sugar, low methoxyl pectin and water are combined and heated so as to form a gelled suspension, the improvement which comprises the additional step of adding xanthan in an amount such the xanthan to pectin ratio is from about 30:70 to about 70:30 based on the total weight of xanthan and pectin added and said xanthan being added.

4. The method of claim 3 wherein the xanthan to pectin ratio is from about 40:60 to about 60:40 based on the total weight of the xanthan and pectin.

5. The yogurt composition comprising the fruit suspension of claim 1 and a cultured milk base wherein the fruit suspension to cultured milk base ratio is from about 20:80 based on the total weight of the yogurt composition.

6. An yogurt composition comprising the fruit suspension of claim 2 and a cultured milk base wherein the fruit suspension to cultured milk base ratio is from about 20:80 based on the total weight of the yogurt composition.

7. A method for making yogurt comprising adding the fruit suspension of claim 1 to a cultured milk base wherein the fruit suspension to cultured milk based ratio is from about 20:80 based on the total weight of the yogurt.

8. A method for making yogurt comprising adding the fruit suspension of claim 2 to a cultured milk base wherein the fruit suspension to cultured milk based ratio is from about 20:80 based on the total weight of the yogurt.

* * * * *